Patented Nov. 29, 1938

2,138,140

UNITED STATES PATENT OFFICE 2,138,140

COATING COMPOSITIONS AND METHOD OF PRODUCING

Irwin C. Clare, Wilmington, Del., assignor to Hercules Powder Company, Wilmington, Del., a corporation of Delaware No Drawing. Application February 8, 1936, Serial No. 62,991

15 Claims. (Cl. 134—26)

My invention relates to varnish and enamel compositions and to a method for the preparation thereof.

Heretofore it has been known to produce varnish compositions by heating a rosin ester-modified phenol-formaldehyde type resin with a drying oil and then thinning the resulting composition with a volatile solvent. Such varnishes are characterized by many desirable properties, such as quick drying, high water and alkali resistance, and excellent durability. However, they have the undesirable property of discoloring on exposure to sunlight or artificial light rich in ultraviolet. This property has restricted the use of the modified phenol-formaldehyde resins, since they are unsuited for finishing light-colored surfaces and for the production of white or light-colored varnishes, which do not discolor after application.

Now, I have discovered that a modified phenol-formaldehyde resin type varnish which is highly resistant to discoloration on exposure to light and which has, at the same time, the desirable properties of the prior art modified phenol-formaldehyde type varnishes, is produced by heating together an oil-soluble phenol-formaldehyde type resin, a hydrogenated rosin ester and a drying oil, and then thinning with a volatile solvent.

The method for the production of my new varnish, then, involves the reaction of an oil-soluble, phenol-formaldehyde resin, hydrogenated rosin ester and a drying oil. I have found, strangely enough, that when I produce a hydrogenated rosin ester modified phenol-formaldehyde resin, and then prepare a varnish by reacting this resin with a drying oil and then thin with a volatile solvent, that the varnish so produced does not show the advantageous resistance to discoloration shown by the varnish produced by the reaction of an admixture of a hydrogenated rosin ester, a phenol-formaldehyde type resin, and a drying oil.

The hydrogenated rosin ester used in the preparation of the varnish in accordance with my invention, may be any monohydric or polyhydric alcohol ester of either hydrogenated wood rosin or hydrogenated gum rosin, or it may be a monohydric or polyhydric alcohol ester of either wood or gum rosin which has been hydrogenated after esterification. The hydrogenated rosin ester used will desirably be hydrogenated to an extent within the range of about 40% to about 90% saturation of two double bonds, and preferably within the range of about 60% to about 70% saturation of two double bonds. The hydrogenated rosin ester used may be an ester of a monohydric alcohol, such as, for example, methyl alcohol, ethyl alcohol, propyl alcohol, iso-propyl alcohol, butyl alcohol, iso-butyl alcohol, amyl alcohol, iso-amyl alcohol, etc., or it may be an ester of a polyhydric alcohol, such as, for example, ethylene glycol, diethylene glycol, diglycol, triethylene glycol, glycerol, pentaerythrite, etc.

The phenol-formaldehyde type resin used in the preparation of a varnish in accordance with my invention may be any oil-soluble, phenol-formaldehyde type resin, of either the oil-reactive or the oil non-reactive type, produced by the reaction of a phenol, such as, phenol or a substituted phenol with an aldehyde, such as, formaldehyde or one of its homologues. Thus, for example the commercially available phenol-formaldehyde type resins known as Durez #550, Super Beckacite 1001, Amberol ST-137, and Bakelite XR 3360 are suitable for this purpose. The drying oil used may be any of the usual drying oils used in the preparation of varnish, such as, for example, tung oil, linseed oil, perilla oil, oiticica oil, etc. The drying oil may be used in the raw state or it may be subjected to the various heat-bodying, oxidizing or thermolizing processes known to the art and then used. The drying oil may be used alone, or in admixture with other drying oils, or it may be used in admixture with a semi-drying oil, such as, for example, soya bean oil, fish oil, etc. When using a semi-drying oil in admixture with the drying oil, the proportion of semi-drying oil must not be sufficiently high to affect the drying characteristics adversely.

A varnish composition, in accordance with my invention, will contain the drying oil, mixture of drying oils, or mixture of drying oil or semi-drying oil, in amount within the range of about 10 gallons to about 100 gallons per 100 pounds of resin contained. The exact proportion of oils contained will depend on the characteristics desired of the final film. For the majority of uses the oils will be within the range of about 10 gallons to about 70 gallons per 100 pounds of resin contained. The total resin content includes the hydrogenated rosin ester and the phenol-formaldehyde type resin. The phenol-formaldehyde type resin or mixture of phenol-formaldehyde resin may comprise from about 1.0% to about 75% of the total resin content, with a hydrogenated rosin ester or mixture of hydrogenated rosin esters making up the remainder. I prefer, however, to use a phenol-formaldehyde type resin or a mixture of different phenol-formaldehyde type resins in amount within the range of about 1% to about 50% of the total resin content. The amount of volatile solvent added to secure the desired consistency for the application of my varnish composition is controlled by the consistency of the resin and oils used, the conditions of cooking, etc., and will usually be added in amount within the range of about 25% to about 70% of the total varnish composition. Any suitable volatile solvent may be used for this purpose, such as, for example, turpentine, benzol, toluol, xylol, the commercial xylol mixture known as Hi-flash Naphtha, petroleum hydrocarbon mixtures, such as those known to the trade as, V. M. and P. Naphtha, Varsol, etc.

The procedure for the preparation of the varnish composition, in accordance with this invention, involves heating a mixture of a hydrogenated rosin ester, or a mixture of hydrogenated rosin esters, a phenol-formaldehyde type resin or a mixture of phenol-formaldehyde type resins and a drying oil, a mixture of drying oils or mixture of drying and semi-drying oils, to a maximum temperature within the range of about 320° F. to about 600° F. The exact temperature used will depend upon the particular phenol-formaldehyde resin used. After the maximum temperature has been reached the batch is then maintained at this temperature or at a temperature not below about 450° F., until the desired consistency is obtained. The composition is then allowed to cool to a temperature low enough to avoid excessive evaporation of the thinning solvent, usually about 440° F., and then thinned to a consistency suitable for application. After the addition of drier, this material is suitable for application as a clear coating. If it is desired to produce an enamel, the desired pigment or pigments, and the drier are ground into the varnish after it is thinned with volatile solvent, or the desired pigment or pigments may be ground into the clear coating described heretofore.

As a specific illustration of the procedure for the production of varnish compositions, in accordance with this invention, the following examples may be cited.

*Example 1*

The following raw material formula was used:

| Raw material | Laboratory amounts | Plant amounts |
| --- | --- | --- |
| Oil reactive phenol-formaldehyde type resin (Super Beckacite 1001, Amberol ST-137 or Bakelite 3360) | *Grams* 25 | 25 lbs. |
| Distilled hydrogenated glycerol ester of rosin (60% saturated) | 75 | 75 lbs. |
| Tung oil (China-wood oil) | 156 | 20 gals. |
| Heat-bodied linseed oil | 19.5 | 2½ gals. |
| Petroleum hydrocarbon thinner (Varsol) | 279.5 | 43 gals. |

The phenol-formaldehyde resin, the hydrogenated rosin ester, and 39 grams (laboratory amount) of tung oil were heated to 450° F. The remainder of the tung oil (117 grams) was then added and the temperature raised to 540° F. The linseed oil was then added to chill the batch and the temperature then maintained at 510°–515° F. to produce a body such that the composition will give a 30 inch string from a cold glass plate. The composition is then cooled to 440° F. and thinned with Varsol.

The varnish made according to Example I may be used as a clear protective and decorative coating or it may be made the basis of an enamel as illustrated by the following example of the preparation of a white enamel.

*Erample II*

The following ingredients were ground together in a ball mill:

Titaium dioxide_____av. oz__ 2
15% titanated lithopone_____do____ 1
Varnish (from Example I)_____liq. oz__ 8
6% cobalt naphthenate drier_____gram__ 0.4
24% lead napththenate drier_____do____ 1.7

The resulting composition was a smooth, white enamel which dried to a glossy, white film of good durability and excellent resistance to discoloration on exposure to light.

An alternate procedure for the production of varnish compositions in accordance with this invention, which is especially suitable for use with certain types of the oil-soluble phenol-formaldehyde type resins, such as, for example, the resin known in the trade as Durez #550, involves heating a mixture of a drying oil and a hydrogenated rosin ester to a temperature within the range of about 550° F. to about 600° F. in a period within the range of about 20 minutes to about 75 minutes, adding the phenol-formaldehyde type resin to chill back to a temperature within the range of about 500° F. to about 560° F. The batch is then held at this temperature for body, and then further chilled by the addition of a portion of a drying or semi-drying oil and the hydrogenated rosin ester. The batch is then thinned by the addition of a volatile solvent.

An illustration of this alternate procedure is given in the following example.

*Example III*

The following raw material formula was used:

| Raw material | Laboratory amounts | Plant amounts |
| --- | --- | --- |
| Oil soluble phenol-formaldehyde resin (Durez #550) | *Grams* 25 | 25 lbs. |
| Distilled hydrogenated glycerol ester of rosin (60% saturated) | 75 | 75 lbs. |
| Tung oil | 156 | 20 gals. |
| Heat-bodied linseed oil | 19.5 | 2½ gals. |
| Petroleum hydrocarbon thinner (Varsol) | 279.5 | 43 gals. |

A mixture of 60 grams of the distilled hydrogenated glycerol ester of rosin and 156 grams of tung oil were heated to 585° F. in a period of about 30 minutes. 25 grams of the oil-soluble, phenol-formaldehyde resin was then added to this mixture and the temperature allowed to drop to 540° F. The mixture was then held at this temperature until a suitable body was attained. The linseed oil and 15 grams of the distilled hydrogenated glycerol ester of rosin were then added and the temperature allowed to drop. When the temperature had dropped to 440° F. the Varsol was stirred in to thin the mixture.

The varnish prepared in Example III is suitable for use as a protective or decorative coating or may be made into a white enamel as illustrated in Example II. The following example illustrates the preparation of another white enamel:

*Example IV*

The following ingredients were ground together in a ball mill:

Titanium oxide pigment_____av. oz__ 2
Varnish (Example III)_____liq. oz__ 8
6% cobalt naphthenate drier_____gram__ ½
24% lead naphthenate drier_____grams__ 2

The product was a white enamel which dried to a glossy white film of good durability and excellent light resistance.

The excellent resistance of my new compositions to discoloration on exposure to ultraviolet light and their unusual durability was exemplified by the following: A series of thirty-three varnishes were prepared from a number of oil soluble phenol-formaldehyde type resins, including both oil-nonreactive and oil-reactive resins, tung oil and various grades of hydrogenated glycerol esters of rosin, similar to those illustrated in Examples I and III given above. Several varnishes of compositions recognized by the art to be outstanding in resistance to discoloration and decidedly superior to the prior art rosin ester modified phenol-formaldehyde varnishes, were then prepared from well-known commercial modified maleate resins. Enamels from each of these varnishes were then prepared in such a way that the only differences in the finished enamels were in the resin or combination of resins contained. Panels were then prepared of each of these enamels by spraying two coats on steel, with 48 hours drying between coats. These panels were then exposed to the radiation of a low-pressure type ultraviolet arc, at a distance of 12 inches, for a period of 4 hours. A visual comparison of the panels so exposed, clearly demonstrated the superiority of the hydrogenated rosin esterphenol formaldehyde type enamels made in accordance with this invention, over the glycerol maleate type enamels in resistance to discoloration. A duplicate set of panels was placed on exterior exposure, at an angle of 45° to vertical, for a period of five months. Periodic examination of these panels demonstrated that the varnishes made in accordance with this invention, were decidedly superior in durability to the prior art varnish compositions.

It will be understood that the details and examples hereinbefore set forth are illustrative only, and that the invention as herein broadly described is in no way limited thereby.

What I claim and desire to protect by Letters Patent is:

1. A protective coating composition including as an ingredient the product of the simultaneous reaction of a hydrogenated rosin ester, a drying oil, and an unmodified, oil-soluble resin of the phenol-formaldehyde type at a maximum temperature of at least about 320° F.

2. A protective coating composition including as ingredients a drier, and the product of the simultaneous reaction of a hydrogenated rosin ester, a drying oil, and an unmodified, oil-soluble resin of the phenol-formaldehyde type at a maximum temperature of at least about 320° F.

3. A protective coating composition including as ingredients a drier, a volatile solvent and the product of the simultaneous reaction of a hydrogenated rosin ester, a drying oil and an unmodified, oil-soluble resin of the phenol-formaldehyde type at a maximum temperature of at least about 320° F.

4. A protective coating composition including as ingredients a pigment, a drier, a volatile solvent and the product of the simultaneous reaction of a hydrogenated rosin ester, a drying oil and an unmodified oil-soluble resin of the phenol-formaldehyde type at a maximum temperature of at least about 320° F.

5. A protective coating composition including as ingredients a drier, a volatile solvent and the product of the simultaneous reaction of a hydrogenated rosin ester, a drying oil, a semi-drying oil and an unmodified oil-soluble resin of the phenol-formaldehyde type at a maximum temperature of at least about 320° F.

6. A protective coating composition including as ingredients a drier, and the product of the simultaneous reaction of a hydrogenated rosin ester, a drying oil and an unmodified oil-soluble, oil-reactive phenol-formaldehyde type resin at a maximum temperature of at least about 320° F.

7. A protective coating composition including as ingredients, a drier, and the product of the simultaneous reaction of a hydrogenated rosin ester, a drying oil and an unmodified oil-soluble, oil-nonreactive, phenol-formaldehyde type resin at a maximum temperature of at least about 320° F.

8. A protective coating composition including as ingredients, a drier, and the product of the simultaneous reaction of hydrogenated glycerol ester of rosin, a drying oil, and an unmodified oil-soluble phenol-formaldehyde type resin at a maximum temperature of at least about 320° F.

9. A protective coating composition including as ingredients a drier, and the product of the simultaneous reaction of hydrogenated glycerol ester of rosin, tung oil, and an unmodified, oil-soluble, phenol-formaldehyde type resin at a maximum temperature of at least about 320° F.

10. A method for the preparation of a protective coating composition which includes simultaneously reacting together a hydrogenated rosin ester, an unmodified, oil-soluble phenol-formaldehyde type resin and a drying oil at a maximum temperature of at least about 320° F. and then thinning the mixture with a volatile solvent.

11. A method for the preparation of a protective coating composition which includes simultaneously heating together a hydrogenated rosin ester, an unmodified, oil-soluble phenol-formaldehyde type resin and a drying oil to a temperature above about 320° F., and then thinning the mixture with a volatile solvent.

12. A method for the preparation of a protective coating composition which includes simultaneously heating together a hydrogenated rosin ester, an unmodified, oil-soluble phenol-formaldehyde type resin, and a drying oil to a temperature within the range of about 320° F. to about 600° F., and then thinning the mixture with a volatile solvent.

13. A method for the preparation of a protective coating composition which includes simultaneously heating together a hydrogenated rosin ester, an unmodified, oil-soluble phenol-formaldehyde type resin, and a drying oil to a temperature within the range of about 320° F. to about 600° F., holding the mixture at a temperature within said range for a period of time sufficient to produce an increase in the viscosity of the mixture and then thinning the mixture with a volatile solvent.

14. A method for the preparation of a protective coating composition which includes simultaneously heating together a hydrogenated rosin ester and a drying oil to a temperature above about 320° F., adding an unmodified, oil-soluble phenol-formaldehyde resin to the hot mixture and thinning the mixture with a volatile solvent.

15. A method for the preparation of a protective coating composition which includes simultaneously heating together a hydrogenated rosin ester and a drying oil to a temperature within the range of about 550° F. to about 600° F. adding an unmodified oil-soluble phenol-formaldehyde resin to the hot mixture, and thinning the mixture with a volatile solvent.

IRWIN C. CLARE.